Nov. 5, 1963  G. J. HAUGHT  3,109,723
WATER SPRAY AND CYCLONE TYPE DUST SEPARATOR
Filed Oct. 12, 1961  2 Sheets-Sheet 1
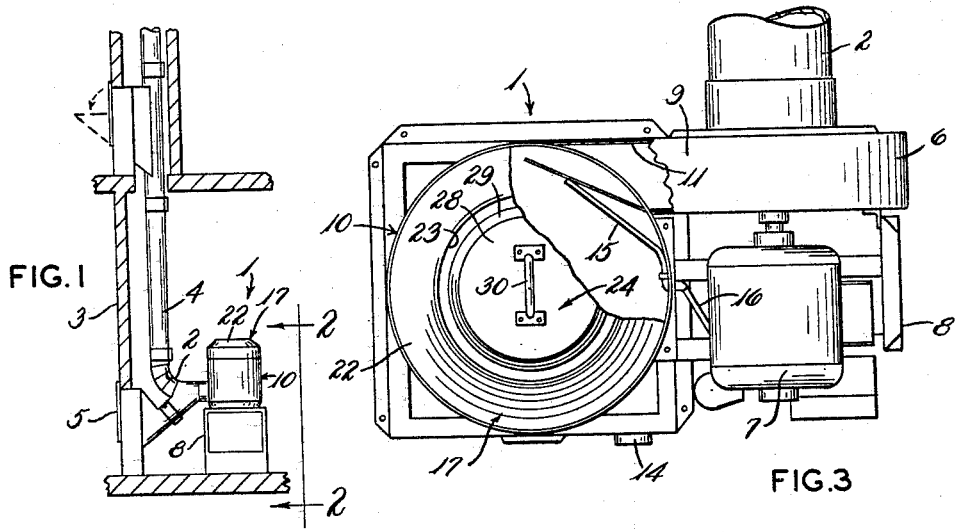
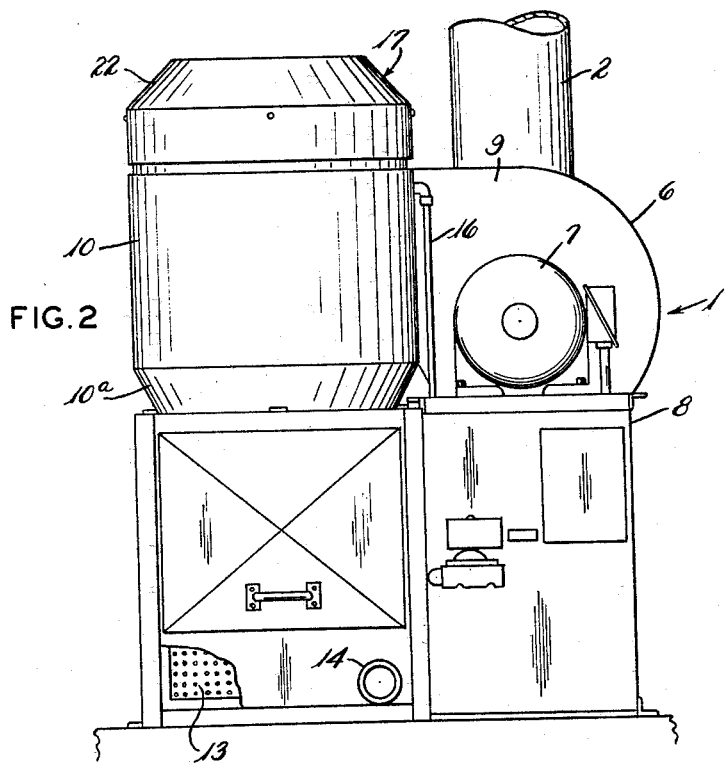
INVENTOR.
GLENN J. HAUGHT
BY Oldham & Oldham
ATTYS.

Nov. 5, 1963  G. J. HAUGHT  3,109,723
WATER SPRAY AND CYCLONE TYPE DUST SEPARATOR
Filed Oct. 12, 1961  2 Sheets-Sheet 2

INVENTOR.
GLENN J. HAUGHT
BY
ATTYS.

United States Patent Office 3,109,723
Patented Nov. 5, 1963

3,109,723
WATER SPRAY AND CYCLONE TYPE DUST SEPARATOR
Glenn J. Haught, Cuyahoga Falls, Ohio, assignor to Wilkinson Chutes, Inc., Akron, Ohio, a corporation of Ohio
Filed Oct. 12, 1961, Ser. No. 144,768
6 Claims. (Cl. 55—228)

This invention relates to dust separators, and especially to a novel and improved water spray and cyclone type dust separator adapted for general use.

Heretofore there have been various types of cyclone separators provided and some of these cyclone separators have used water in the separator to aid in filtering out, or washing out dust and dirt particles in the air which thereafter can be exhausted from the separator and returned to the atmosphere, or be otherwise reused, as desired.

These separators have had varying degrees of efficiency, and the cost of these separators have varied widely both in initial cost, and cost of operations and efficiency of dust and dirt removal from the air being processed.

It is the general object of the present invention to provide a novel and improved water spray and cyclone type dust separator characterized by the improvement in water retention in a cyclone separator for dust collecting action and by the novel and improved air flow control means present in the apparatus.

Another object of the invention is to provide a special center baffle in the dust separator unit of the invention and where a plurality of radially directed, vertically extending baffles are provided in the cyclone shell of the apparatus to aid in obtaining a desirable air flow pattern and retention time for air in the cyclone separator and to change the air flow direction therein to facilitate dropping out dust and dirt particles in the processed air while it is flowing through the cyclone shell of the apparatus.

Further objects of the invention are to provide a novel and improved air spray means in a cyclone type dust separator and where the apparatus will retain an appreciable volume of water therein at all times during its operation to facilitate maximum absorption of dust and dirt by the water and efficient purifying action of the air being processed by centrifugal action; to provide a removable top cap in a cyclone shell dust separator apparatus where the top cap prevents any rapid flow of air out of the cyclone shell in the separator of the invention by having a tubular extension on the top cap extend vertically downwardly of the air inlet in the cyclone shell whereby air must initially move downwardly in the shell prior to any release or discharge from the cycline shell; to introduce air in a tangentially directed stream in the cyclone shell in direct association with a tangentially directed air spray and with both such fluids being introduced into the cyclone shell adjacent the top thereof; to provide a release and filter means at the bottom of the cyclone shell for water with collected dirt and dust therein; to provide a novel removable center baffle unit in the cyclone shell for partly defining a restricted air discharge path in association with the top cap for the cyclone shell; and to force a stream of air being processed into the cyclone shell for expansion therein and for reducing the speed of flow of the air being processed while it moves through and upwardly out of the cyclone shell.

The foregoing and other objects and advantages of the invention will be made more apparent as the specification proceeds.

In order to understand the present invention more completely, attention is now directed to the accompanying drawings, wherein:

FIG. 1 is an elevation showing a dust separator unit of the invention operatively associated with a building structure, a portion of which is shown in vertical section;

FIG. 2 is an enlarged elevation of the water spray and cyclone type dust separator embodying the principles of the invention and shown in FIG. 1;

FIG. 3 is a plan view of the apparatus of FIG. 2;

Figures 4, 5, 6, 7:
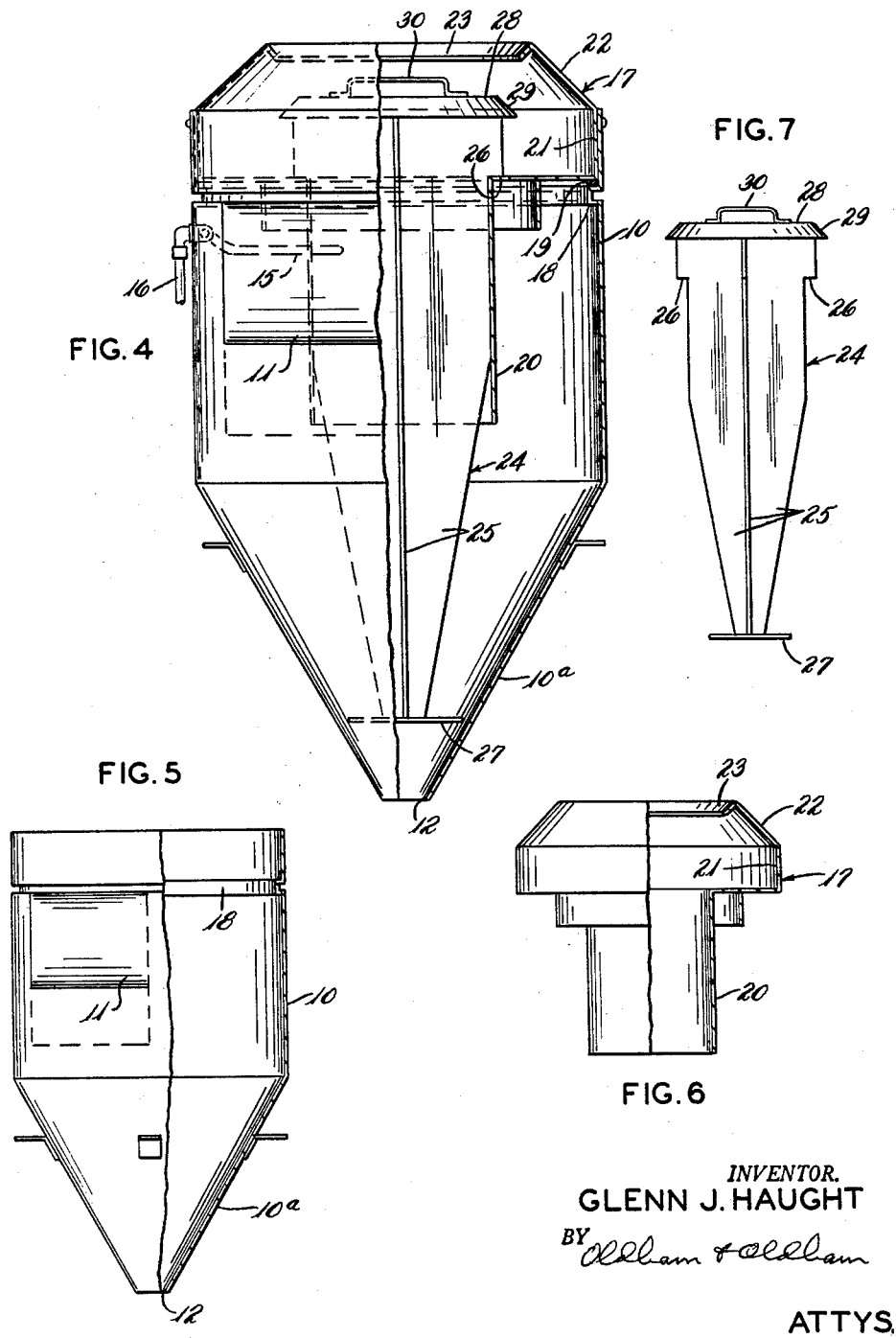
FIG. 4 is an enlarged fragmentary vertical section through the cyclone shell and associated means in the dust separator of the invention.

FIG. 5 of the drawings is an elevation, partially broken away and shown in vertical section of the cyclone shell of the invention;

FIG. 6 is an elevation, partially broken away and shown in vertical section, of the top cap in the apparatus of the invention; and FIG. 7 is an elevation of the center baffle means or unit used in the apparatus of the invention.

When referring to corresponding members shown in the drawings and referred to in the specification, corresponding numerals are used to facilitate comparison therebetween.

Generally speaking, the present invention relates to a water spray and cyclone type of a dust separator comprising a cylindrical cyclone shell having a lower portion tapering inwardly to a reduced diameter water discharge opening at its lower end and having an air inlet at the top thereof extending generally tangentially thereto, a water spray nozzle extending into the cyclone shell adjacent its upper end and directed generally tangentially of the cyclone shell to mix with any air or air stream moving through the cyclone shell, an annular top cap operatively positioned in the upper portion of the cyclone shell and having a dependent annular section, and a center unit removably and operatively engaging a portion of the top cap and including a plurality of radially directed vertically extending baffles extending down through the annular section to form restricted upwardly extending air discharge passageways in the separator whereby dust and water particles in the dust separator will tend to drop from the air stream prior to upward discharge flow of such air in moving from the dust separator.

Attention now is particularly directed to the details of the structure shown in the drawings, and a water spray and cyclone type of a dust separator is indicated as a whole by the numeral 1. Such dust separator 1 is shown as having an inlet tube or conduit 2 extending therefrom and with it being positioned, usually, in the basement of a building indicated at 3. This building has a vertically extending collector chute or duct 4 provided therein and with one or more hoppers, or registers 5 being provided at vertically spaced portions of or on different floors of the building whereby dust, dirt and other small particles of refuse can be deposited or be pulled into the duct 4 for processing. These registers 5 or the like may be continually open, if desired, to permit air to be drawn therein at all times, or any type of a removable closure member can be provided in association therewith. Naturally the duct 4 may connect to any suitable spot for either continuously or intermittently sucking up dust laden air from a room for processing in the dust separator 1 of the invention.

The inlet, or conduit 2 of the apparatus connects to a fan housing 6 in which a suitable fan member (not shown) is provided and is driven by an electric motor 7, or the like. This motor 7 may be positioned on a frame 8 and have conventional controls associated therewith. The fan housing 6 has a discharge section 9 extending therefrom that connects with a cyclone shell 10 that forms one of the main components of the dust separator 1. A connection, or inlet 11 on the cyclone shell connects to the discharge tube 9 from the fan housing 6 in a conventional manner whereby the dust and dirt laden air can be forced into the cyclone shell 10 in a general direction tangentially thereto under any suitable pressure as set up by a control on the electric motor 7.

This cyclone shell 10 of the invention tapers inwardly adjacent its lower end 10a, which is of conical shape, and which has a reduced diameter water discharge opening 12 at its lower end. As indicated in FIG. 2, usually some type of a filter member or filter basket 13 is removably associated with the discharge opening 12 of the cyclone shell for receiving the dirty water discharged therefrom whereby the filter 13 can serve to remove strings, large particles of dust, pieces of cloth, etc., that may be present in the water before it is discharged through a drain pipe 14 which connects to a lower portion of the filter means 13. Normally this filter 13 is so associated with the discharge opening 12 that only a minimum of air can flow out of such discharge opening. If desired, the rate of flow of water to and from the cyclone shell 10 can be so regulated as to provide a small volume of water covering the opening 12 whereby air will not exhaust therefrom, if desired.

It is a feature of the present invention that the cyclone shell 10 is provided with a blast or stream of water that can be supplied from a nozzle 15 which, as indicated in FIG. 3, extends generally tangentially of the cyclone shell 10, usually adjacent the inlet 11 at a slight angle thereto. The stream of water forced into the cyclone shell 10 from a suitable supply line 16, connecting to the nozzle, will mix with the air forced into the cyclone shell. Such water supplied to the cyclone shell 10 will normally swirl around the inner walls of the cyclone shell and will build up a suitable volume of water in the shell but will ultimately flow from the shell by gravity action. It should be realized that dust and dirt particles present in the air stream forced into the cyclone shell through the inlet 11 will be thrown by centrifugal force to the outer periphery of the shell and thus will be wetted by, or mixed with the water stream or water curtain provided at the periphery of the cyclone shell so that such dust, dirt, or lint particles, or the like will become absorbed by the water and will move therewith for discharge from the cyclone shell 10.

It is an important feature of the present invention that the air flow path or exhaust system provided in association with the cyclone shell 10 is such as to cause the air admitted thereinto to flow circumferentially thereof for some period of time and then to move upwardly by a restricted air flow path so as to cause any dust, dirt and water particles tending to move with the air stream to drop therefrom prior to complete exhaust of the air from the dust separator. In order to achieve such end, means, such as an annular top cap 17, FIG. 6, is provided for, usually, removable positioning within the cyclone shell 10 adjacent the upper end thereof. The cyclone shell 10 has a support member such as an annular rib or bead 18 provided on its inner periphery adjacent its upper end and with a member, such as a resilient gasket 19, being provided on the upper edges of this bead or support means to seal the connection therebetween. The top cap 17 also includes a downwardly extending annular section or tube 20 formed integrally with or suitably secured to the top cap 17 and with such dependent section or tube 20 extending downwardly of the cyclone shell an appreciable distance below the inlet 11 therefor. Any air flowing from the dust separator 1 must flow vertically upwardly through this dependent section 20 which has an enlarged section 21 provided adjacent its upper end. The upper end of this enlarged section 21 has a conically inwardly extending portion 22 that terminates in the downwardly and inwardly extending edge bead or flange 23 which directs any air or other fluid flowing upwardly of the inner surface of the top portion of the top cap downwardly prior to discharge from the dust separator 1 whereby yet a further dust and water separating action is obtained in the apparatus of the invention.

A further important element in the air flow control means in the dust separator 1 comprises a center unit 24 that removably and operatively engages an upper portion of the dust separator 1, usually the top cap 17 received therein. This center unit 24 has a plurality of vertically extending baffles 25, 25 formed as a portion thereof and with downwardly facing shoulders 26 being formed on such baffles adjacent their upper ends. These shoulders 26 are of a size as to engage with the upper end of the dependent section 20 of the top cap and with the radially outer portions of the baffles 25 usually being fairly snugly received in such dependent section 20 of the top cap. The vertically extending baffles 25 extend downwardly of the cyclone shell preferably to a point adjacent and above the discharge opening 12 provided therein. Preferably a lower end flange 27 is present on the center unit 24 and it is positioned horizontally in the dust separator and is formed to extend to a point adjacent the lower surfaces of the cyclone shell. The center unit also includes means, such as a top plate 28 or the like, suitably secured thereto and usually engaging the upper end of the baffles 25. The top plate 28 terminates in a downwardly and outwardly extending annular edge flange 29 formed thereon. The size of the center unit 24 in relation to the top cap 17 is such that the center unit normally is positioned below the upper margins of the top cap 17 but with a handle 30 secured to the top surface of the top plate 28 being provided so that such center unit can be lifted from the rest of the dust collector, when desired.

Air currents moving up along the vertically extending baffles 25 will normally strike the undersurface of the top plate 28 and be deflected downwardly and outwardly therefrom to contact the upper section 22 of the top cap 17 and usually be downwardly deflected again prior to exhaust or release from the dust separator 1. It will be realized that any dust particles, water spray or drops, and the like, in the air stream will tend to be released, or discharged therefrom at any time in the passage of the air through the apparatus. The primary amount of such particles will be removed by centrifugal action and contact with the water curtain or stream flowing along the edges of the cyclone shell. However, particles of water may be splashed around within the cyclone separator or shell and engage dust particles at any portion of movement through the cyclone shell. Such heavy particles and at least most residual dust particles are dropped out of the air stream as it moves up along the baffles 25.

It will be realized that water supplied to the nozzle 15 should be forced therefrom with sufficient velocity as to aid such water in swirling around the inner surface of the cyclone shell 10 and not flowing directly down to the discharge opening 12 therein. By providing an appreciable tangentially directed force in the water nozzle stream, the water will tend to build up a continuous water curtain within the cyclone shell and with water flow being obtained therefrom only after several minutes, or longer operation of the dust separator.

It is belived that the components of this dust separator can be relatively inexpensively made from durable materials, such as sheet metal, and the like and with the dust separator as set up and used providing an effective dust and dirt separating and removing action. Only a minimum amount of water needs to be used in the dust separator as it can have relatively slow flow of water therethrough. Hence it is believed that the objects of the invention have been achieved.

While one complete embodiment of the invention has been disclosed herein, it will be appreciated that modification of this particular embodiment of the invention may be resorted to without departing from the scope of the invention as defined in the appended claims.

What I claim is:

1. A water spray and cyclone type of a dust separator comprising a cylindrical cyclone shell having a lower portion tapering inwardly to a reduced diameter lower end and having an air inlet at the top thereof extending tangentially thereto, a water spray nozzle extending into said cyclone shell at the upper end thereof adjacent said air inlet and directed generally tangentially of said cyclone shell to discharge water into an air stream as introduced into said cyclone shell and to wet and pick up dust particles therein, a horizontally positioned annular support member operatively positioned within the upper end of said cyclone shell on the inner periphery thereof, a removable annular top cap positioned on said support member and having a dependent annular section extending downwardly from said support member to terminate below said air inlet, a center unit removably received through said annular top cap engaging and supported on a portion of said top cap, said center unit including a plurality of radially directed vertically extending baffles extending down through said annular section to terminate below said top cap and adjacent the lower end of said cyclone shell for air flow up along said vertically extending baffles, and a top means engaging said center unit and spaced radially from said top cap to form a limited discharge space for air flow upwardly from the separator.

2. A water spray and cyclone type of a dust separator comprising a cylindrical cyclone shall having a lower portion tapering inwardly to a reduced diameter lower end and having an air inlet adjacent the top thereof extending generally tangentially thereto, a water spray nozzle extending into said cyclone shell at the upper end thereof adjacent said air inlet and directed generally tangentially of said cyclone shell to discharge water into an air stream as introduced into said cyclone shell to wet dust particles therein, support means operatively positioned within the upper end of said cyclone shell at the periphery thereof, a removable annular top cap positioned on said support means and having a dependent annular section extending downwardly therefrom, said top cap having an upwardly and inwardly converging upper end, a center unit removably received through said annular top cap and engaging a portion of said top cap, said center unit including a plurality of radially directed vertically extending baffles extending down through said annular section to terminate below said top cap and adjacent the lower end of said cyclone shell for air flow up along said vertically extending baffles, and a top means engaging said center unit and spaced radially and vertically from adjacent portions of said top cap to form a limited discharge space for air flow from the separator.

3. A water spray and cyclone type of a dust separator comprising a cylindrical cyclone shell having a lower portion tapering inwardly to a reduced diameter water discharge opening at its lower end and having an air inlet at the top thereof extending generally tangentially thereto, removable filter means located outside said cyclone shell adjacent said water discharge opening to filter all water passing through said water discharge opening, a water spray nozzle extending into said cyclone shell at the upper end thereof adjacent said air inlet and directed generally tangentially of said cyclone shell to mix with an air stream moving through said cyclone shell, a removable annular top cap operatively positioned on the upper portion of said cyclone shell and having a dependent annular section extending downwardly into said cyclone shell, a center unit removably received through said annular top cap and operatively engaging a portion of said top cap, said center unit including a plurality of radially directed vertically extending baffles extending down through said annular section and terminating adjacent the lower end of said cyclone shell, a substantially circular plate operatively affixed to the lower ends of said baffles and located in closely spaced relation to the inner periphery of the lower end of said cyclone shell, said plate restricting the flow of water through said water discharge opening to prevent the escape of air through said water discharge opening, said baffles being snugly received in said annular section and producing air flow up along said vertically extending baffles, and a top operatively engaging said center unit and spaced radially from adjacent portions of said top cap to form a limited discharge space therebetween for air flow upwardly from the separator, said top having a downwardly and outwardly inclined edge flange thereon connecting to the upper end of said baffles, said top cap having a downwardly and inwardly inclined edge bead thereon above said top and encompassing said top cap to provide an air discharge opening therebetween.

4. A water spray and cyclone type of a dust separator comprising a cylindrical cyclone shell having a lower portion tapering inwardly to a reduced diameter water discharge opening at its lower end and having an air inlet at the top thereof extending generally tangentially thereto, a water spray nozzle extending into said cyclone shell at the upper end thereof adjacent said air inlet and directed generally tangentially of said cyclone shell to mix with an air stream moving through said cyclone shell, an annular top cap operatively positioned on the upper portion of said cyclone shell and having a dependent annular section spaced radially from said cyclone shell, a center unit removably and operatively engaging a portion of said top cap and including a plurality of radially directed vertically extending baffles extending down through said annular section substantially into the lower tapered portion of said cyclone shell to a point adjacent the lower end of said cyclone shell, said baffles being snugly received in said annular section and interrupting the circumferential flow of mixed water and air in the tapered portion of said cyclone shell to direct the air flow up along the vertically extending baffles, and a top operatively engaging said center unit and spaced radially from adjacent portions of said top cap to form a limited discharge space therebetween for air flow from the separator, said top cap having a downwardly and inwardly inclined edge flange thereon extending into an air discharge opening between said top and top cap.

5. A water spray and cyclone type of a dust separator comprising a cylindrical cyclone shell having a lower portion tapering inwardly to a reduced diameter water discharge opening at its lower end and having an air inlet at the top thereof extending generally tangentially thereto, a water spray nozzle extending into said cyclone shell at the upper end thereof adjacent said air inlet and directed generally tangentially of said cyclone shell to mix with an air stream moving through said cyclone shell, an annular top cap operatively positioned on the upper portion of said cyclone shell and having a dependent annular section, a center unit removably and operatively engaging a portion of said top cap and including a plurality of radially directed vertically extending baffles extending down through said annular section and terminating adjacent the lower end of said cyclone shell, said center unit having a horizontal lower end flange secured thereto and having its peripheral edge adjacent to but spaced from said cyclone shell to restrict flow of fluids between said end flange and cyclone shell, said baffles being snugly received in said annular section and producing air flow up along said vertically extending baffles, and a top operatively engaging said center unit and spaced radially from adjacent portions of said top cap to form a limited discharge space therebetween for air flow from the separator.

6. A water spray and cyclone type of a dust separator comprising a cylindrical cyclone shell having a lower portion tapering inwardly to a reduced diameter water discharge opening at its lower end and having an air inlet at the top thereof extending generally tangentially thereto, a water spray nozzle extending into said cyclone shell at the upper end thereof adjacent said air inlet and directed generally tangentially of said cyclone shell to mix with an air stream moving through said cyclone shell, an annular top cap operatively positioned on the upper portion of said cyclone shell and having a dependent annular section, a center unit removably received through said top cap and operatively engaging a portion of said top cap, said center unit including a plurality of radially directed vertically extending baffles extending down through said annular section substantially into the lower tapered portion of said cyclone shell to form upwardly extending air discharge passageways in the separator, and horizontal plate means operatively positioned on the lower ends of said baffles and terminating adjacent a tapered portion of said shell to restrict the flow of water from said water discharge opening.

References Cited in the file of this patent

UNITED STATES PATENTS

| | | |
|---|---|---|
| 969,769 | Brassert et al. | Sept. 13, 1910 |
| 1,545,748 | Filkins | July 14, 1925 |
| 1,875,755 | Noyes | Sept. 6, 1932 |
| 2,010,128 | Arnold | Aug. 6, 1935 |
| 2,222,930 | Arnold | Nov. 26, 1940 |
| 2,238,280 | Nutting | Apr. 15, 1941 |

FOREIGN PATENTS

| | | |
|---|---|---|
| 517,209 | Belgium | Feb. 14, 1953 |
| 774,406 | Great Britain | May 8, 1957 |